(12) United States Patent
Rock

(10) Patent No.: US 11,685,448 B2
(45) Date of Patent: Jun. 27, 2023

(54) DRAW BAR STOWAGE

(71) Applicant: GM GLOBAL TECHNOLOGY OPERATIONS LLC, Detroit, MI (US)

(72) Inventor: Michael D. Rock, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 67 days.

(21) Appl. No.: 17/515,995

(22) Filed: Nov. 1, 2021

(65) Prior Publication Data

US 2023/0136905 A1    May 4, 2023

(51) Int. Cl.
| | | |
|---|---|---|
| *B62D 33/02* | (2006.01) | |
| *B60R 13/01* | (2006.01) | |
| *B60R 11/06* | (2006.01) | |
| *B62D 33/033* | (2006.01) | |
| *B62D 33/037* | (2006.01) | |
| *B60D 1/58* | (2006.01) | |

(52) U.S. Cl.
CPC ............ *B62D 33/033* (2013.01); *B60R 11/06* (2013.01); *B60R 13/01* (2013.01); *B62D 33/02* (2013.01); *B62D 33/037* (2013.01); *B60D 1/58* (2013.01)

(58) Field of Classification Search
CPC .. B62D 33/02; B62D 33/0207; B62D 33/022; B62D 33/023; B60R 13/01; B60R 2013/016; B60R 9/06; B60R 2011/004; B60R 11/06; B60D 1/06; B60D 1/58; B60D 1/60

See application file for complete search history.

(56) References Cited

U.S. PATENT DOCUMENTS

| | | | | |
|---|---|---|---|---|
| 3,661,420 | A * | 5/1972 | Swanson ............ | B62D 33/0207 296/43 |
| 4,986,590 | A * | 1/1991 | Patti ........................ | B60R 13/01 220/23.9 |
| 5,673,956 | A * | 10/1997 | Emery .................... | B60R 13/01 296/208 |
| 5,823,601 | A * | 10/1998 | Stanesic .................. | B60R 13/01 296/43 |
| 6,832,709 | B2 * | 12/2004 | Henry ...................... | B60D 1/06 224/403 |
| 8,231,035 | B1 * | 7/2012 | Michael .................... | B60D 1/60 224/403 |
| 8,308,183 | B1 * | 11/2012 | McElhinney, Jr. ...... | B60D 1/60 280/491.5 |
| 8,469,429 | B1 * | 6/2013 | Spronk .................... | B60R 11/00 296/37.1 |
| 9,004,521 | B2 * | 4/2015 | Dringenberg ............ | B60D 1/58 280/491.4 |
| 9,227,675 | B1 * | 1/2016 | Elquest .................... | B60P 1/64 |
| 9,272,740 | B1 * | 3/2016 | Portenier ............... | B62D 33/02 |
| 9,511,721 | B1 * | 12/2016 | Hawkins ................. | B60R 11/06 |
| 9,783,016 | B2 * | 10/2017 | Forhan .................... | B60R 11/06 |
| 10,189,510 | B1 * | 1/2019 | Higgins ............. | B62D 33/0207 |
| 10,899,403 | B2 * | 1/2021 | Bussell ..................... | B60D 1/58 |
| 2003/0057676 | A1 * | 3/2003 | Griggs ..................... | B60D 1/58 280/507 |

(Continued)

*Primary Examiner* — Gregory A Blankenship
(74) *Attorney, Agent, or Firm* — Cantor Colburn LLP

(57) ABSTRACT

A draw bar stowage apparatus includes an opening through the bed floor of the cargo box of a pickup truck for receiving the insertion end of a draw bar. The stowage apparatus may include an additional bracket beneath the bed floor, bed protection, a plug and adjustable tether for securing a stowed draw bar.

20 Claims, 3 Drawing Sheets

(56) References Cited

U.S. PATENT DOCUMENTS

| | | | |
|---|---|---|---|
| 2003/0230608 A1* | 12/2003 | Henry | B60D 1/06 |
| | | | 224/403 |
| 2007/0046056 A1* | 3/2007 | Delaney | B62D 29/043 |
| | | | 296/37.6 |
| 2008/0264991 A1* | 10/2008 | Foster | B60R 9/06 |
| | | | 224/519 |
| 2009/0224511 A1* | 9/2009 | Dick | B60D 1/54 |
| | | | 280/511 |
| 2010/0314899 A1* | 12/2010 | Slacks | B60R 11/06 |
| | | | 296/37.6 |
| 2014/0084567 A1* | 3/2014 | Schwennsen | B60D 1/58 |
| | | | 280/495 |
| 2014/0091563 A1* | 4/2014 | Dringenberg | B60D 1/52 |
| | | | 280/769 |
| 2014/0339791 A1* | 11/2014 | McCall | B60D 1/485 |
| | | | 280/491.5 |
| 2016/0001711 A1* | 1/2016 | Hughes | B60D 1/58 |
| | | | 224/403 |
| 2016/0303934 A1* | 10/2016 | Olson | B60R 11/06 |
| 2016/0347259 A1* | 12/2016 | Hawkins | B60R 11/06 |
| 2017/0043729 A1* | 2/2017 | Courtright | B60R 13/01 |
| 2017/0080873 A1* | 3/2017 | Forhan | B60D 1/58 |
| 2017/0158147 A1* | 6/2017 | Harrison | B60R 11/06 |
| 2019/0160995 A1* | 5/2019 | Lindquist | B61D 3/08 |
| 2019/0225166 A1* | 7/2019 | Williams | B62D 33/023 |
| 2020/0317277 A1* | 10/2020 | Jansma | F16B 19/02 |
| 2022/0072919 A1* | 3/2022 | Garner | B60D 1/488 |
| 2022/0097589 A1* | 3/2022 | Marchlewski | B60P 7/0807 |
| 2022/0289122 A1* | 9/2022 | Ladosz | B60R 11/06 |

\* cited by examiner

DRAW BAR STOWAGE

INTRODUCTION

The subject disclosure relates to draw bar storage. More particularly, the disclosure relates to draw bar storage for pickup truck applications.

Pickup trucks are commonly used for towing trailers, campers and the like using a receiver hitch and removable draw bar. It may be desirable to remove the draw bar from the receiver hitch when not in use to deter theft of the draw bar and unintended discovery with one's shin. The draw bar may be stored loose in the open pickup bed but such stowage does little to deter theft and, being unsecured, may slide around or be ejected from the bed. Commonly, vehicle operators choose to store draw bars within the pickup cab when not in use. Draw bars are heavy and irregularly shaped, making storage in the pickup cab challenging. Additionally, draw bars may be grimy and greasy and undesirable for the interior of a pickup cab.

SUMMARY

In one exemplary embodiment, a draw bar stowage apparatus includes a bed floor in a cargo box of a pickup truck defining a first opening large enough to accept an insertion end of a draw bar but too small to pass a coupling end of the draw bar.

In addition to one or more of the features described herein, the first opening may include a flanged opening.

In addition to one or more of the features described herein, the first opening may be positioned rearward of a wheel well.

In addition to one or more of the features described herein, the first opening may be positioned between a sidewall of the cargo box and a main floor region of the bed floor that is delimited by the wheel wells.

In addition to one or more of the features described herein, the first opening may be positioned forward of a wheel well.

In addition to one or more of the features described herein, the first opening may be positioned between a sidewall of the cargo box and a main floor region of the bed floor that is delimited by the wheel wells.

In addition to one or more of the features described herein, the apparatus may include a bracket beneath the bed floor and defining a second opening large enough to accept the insertion end of the draw bar.

In addition to one or more of the features described herein, the bracket may be attached to the bed floor.

In addition to one or more of the features described herein, the bracket may be attached to a lateral cross member attached to the bed floor.

In addition to one or more of the features described herein, the apparatus may include an escutcheon lining the first opening.

In addition to one or more of the features described herein, the escutcheon may extend from a bed protection panel covering a portion of the bed floor.

In addition to one or more of the features described herein, the apparatus may include a sidewall protection panel extending from the bed protection panel and covering a portion of a sidewall of the cargo box.

In addition to one or more of the features described herein, the apparatus may include an adjustable tether coupled to one of the bed floor and a sidewall of the cargo box and configured for retaining the coupling end of a stowed draw bar.

In addition to one or more of the features described herein, the apparatus may include a removable plug for insertion into the escutcheon.

In addition to one or more of the features described herein, the apparatus may include a removable plug for insertion into the escutcheon and flexibly attached to the bed protection panel.

In another exemplary embodiment, a draw bar stowage apparatus may include a cargo box of a pickup truck including a bed floor, sidewalls and wheel wells, the bed floor of the cargo box including a main floor region laterally delimited by the wheel wells and floor regions forward and rearward of the wheel wells and delimited by the wheel wells, the sidewalls and the main floor region. One of the floor regions forward and rearward of the wheel wells may define a first opening through the bed floor large enough to accept an insertion end of a draw bar but too small to pass a coupling end of the draw bar. A bracket may be beneath the bed floor and define a second opening large enough to accept the insertion end of the draw bar.

In addition to one or more of the features described herein, the one of the floor regions forward and rearward of the wheel wells may include a floor region rearward of a wheel well.

In addition to one or more of the features described herein, the apparatus may further include a bed protector including a bed protection panel and an inner wall protection panel wherein the bed protection panel includes an aperture aligned with the first opening through the bed floor.

In addition to one or more of the features described herein, the one of the floor regions forward and rearward of the wheel wells may include a floor region rearward of a wheel well. The apparatus may further include a bed protector including a bed protection panel and an inner wall protection panel wherein the bed protection panel includes an aperture aligned with the first opening through the bed floor, and an adjustable tether coupled to one of the bed floor and a sidewall of the cargo box and configured for retaining the coupling end of a stowed draw bar.

In yet another exemplary embodiment, a draw bar stowage apparatus may include a cargo box of a pickup truck including a bed floor, sidewalls and wheel wells, the bed floor of the cargo box including a main floor region laterally delimited by the wheel wells and a floor region rearward of a wheel well and delimited by the wheel well, a sidewall and the main floor region. A floor region rearward of a wheel well may define a first opening through the bed floor large enough to accept an insertion end of a draw bar but too small to pass a coupling end thereof. A bracket may be attached to the bed floor and positioned beneath the bed floor and define a second opening large enough to accept the insertion end of the draw bar. A bed protector may include a bed protection panel, an inner wall protection panel, and an escutcheon inserted into the first opening. A removable plug for insertion into the escutcheon may be flexibly attached to the bed protection panel. An adjustable tether may be coupled to the cargo box and configured for retaining the coupling end of a stowed draw bar.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
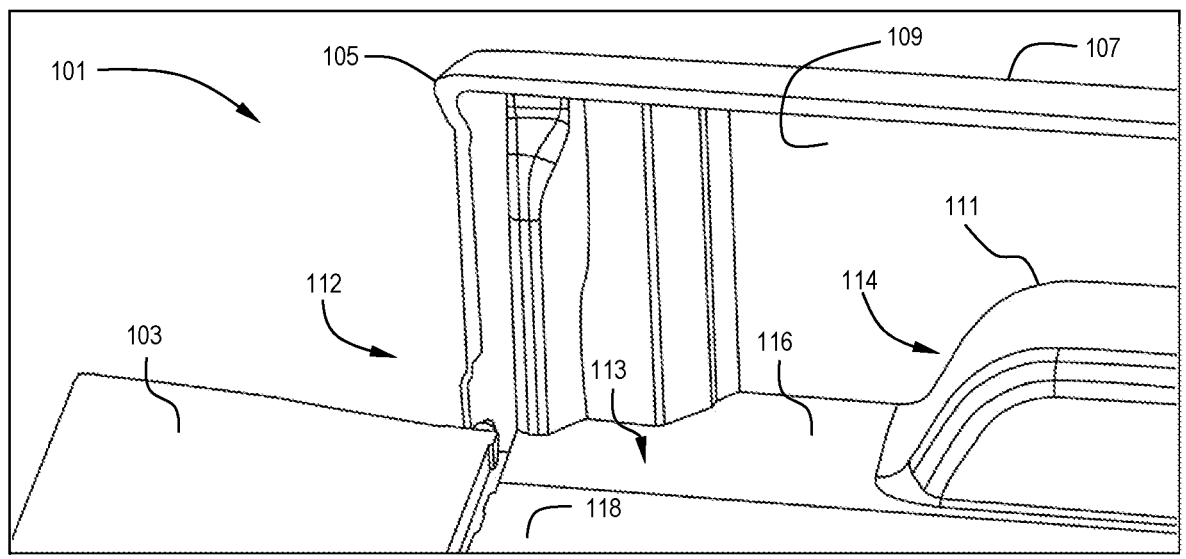
FIG. 1 illustrates a portion of a pickup truck showing one side of a cargo box bed area including a sidewall and a substantially horizontal bed floor, in accordance with the present disclosure.

The following description is merely exemplary in nature and is not intended to limit the present disclosure, its application or uses. It should be understood that throughout the drawings, corresponding reference numerals indicate like or corresponding parts and features.

In accordance with various features and embodiments, a draw bar stowage system for a pickup bed is described herein. A draw bar stowage system in accordance with various embodiments may stow draw bars of varying lengths, including extended length draw bars used for increasing the freedom of articulation and preventing trailer interference with the rear of the tow vehicle. A draw bar stowage system in accordance with various embodiments may be integrated into the pickup bed cargo box and is adaptable to various cargo box configurations such as no cargo box liner, spray on cargo box liners and drop-in cargo box liners. Advantageously, a draw bar stowage system in accordance with various embodiments maintains the draw bar mass low in the cargo box and manages the momentum of the substantial mass of the draw bar through the pickup bed cargo box structure.

With reference to FIG. 1, a portion of a pickup truck 101 is illustrated showing one side of a cargo box bed area 112 including sidewalls 105 and a substantially horizontal bed floor 113. A hinged tailgate 103 may also be located between sidewalls 105 at the rear of the cargo box. The sidewall 105 may include an outer wall 107 and a substantially vertical inner wall 109. The bed floor 113 may include several panels including an inner bed panel 118 configuring a main floor region between wheel wells 111. An outer bed panel 114 may include wheel well 111 and a bed panel 116. Thus, a main floor region is laterally delimited by the wheel wells, and floor regions forward and rearward of the wheel wells are delimited by the wheel wells, the sidewalls and the main floor region. The outer wall 107, inner wall 109, outer bed panels 114 and inner bed panel 118 may be formed from steel, other metal alloys, plastics or composite material. For the purposes of this disclosure, steel is the assumed material for the outer wall 107, inner wall 109, outer bed panels 114 and inner bed panel 118. Alternate bed floor 113 configurations are envisioned including a unitary structure including wheel wells and all bed floor features.

Figure 2:
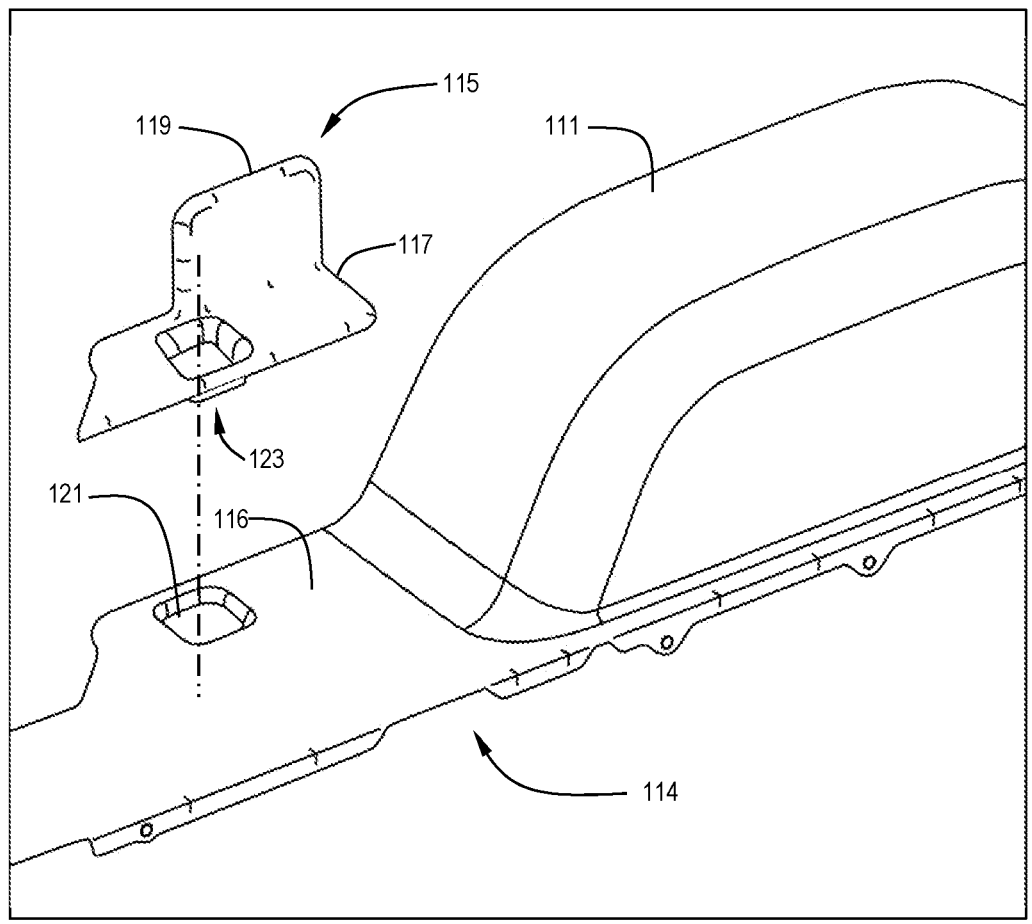
FIG. 2 illustrates an outer bed panel including a wheel well and a bed panel located to the rear of the wheel well, in accordance with the present disclosure.

FIG. 2 illustrates an outer bed panel 114 including a wheel well 111 and a bed panel 116 located to the rear of (i.e., behind) the wheel well 111. Though not illustrated, the outer bed panel 114 may include another bed panel located to the front of (i.e., forward) the wheel well 111. Although the described embodiments are focused on the area of the bed floor 113 behind the wheel well 111, it is understood that alternative embodiments are applicable to other areas of the bed floor 113 including forward of the wheel well 111. The bed panel 116 behind the wheel well 111 includes opening 121 which may be a flanged opening as shown and which is dimensioned large enough to pass the inserted portion of a draw bar, for example, a standard 2-inch by 2-inch draw bar. The flanged opening 121 may be formed during fabrication of the outer bed panel 114, for example with well-known metal feature forming and stamping processes including punching, die forming, drawing, rolling and cutting to name a few. In accordance with one embodiment, an escutcheon 123 may line the opening 121 with the interior dimensions of the escutcheon 123 being dimensioned large enough to pass the insertion end of a draw bar but too small to pass the coupling end thereof (e.g., the end with a drop and hitch ball). The escutcheon 123 may be part of a larger bed protector 115. The bed protector 115 may include a bed protection panel 117 integrated with the escutcheon 123 with the escutcheon extending therefrom and defining an aperture aligned with the opening 121. The bed protector 115 may further include an inner wall protection panel 119. The escutcheon 123, bed protection panel 117 and inner wall protection panel 119 are functional to prevent metal to metal contact between an inserted draw bar (including drop and hitch ball) and the flanged opening 121, bed panel 116 and inner wall 109, thereby advantageously avoiding undesirable noise, damage, and wear. The escutcheon 123 and bed protector 115 may be manufactured from any suitable material including, for example, polyethylene, polypropylene, flexible PVC, nylon, ABS, etc.

Figure 3:
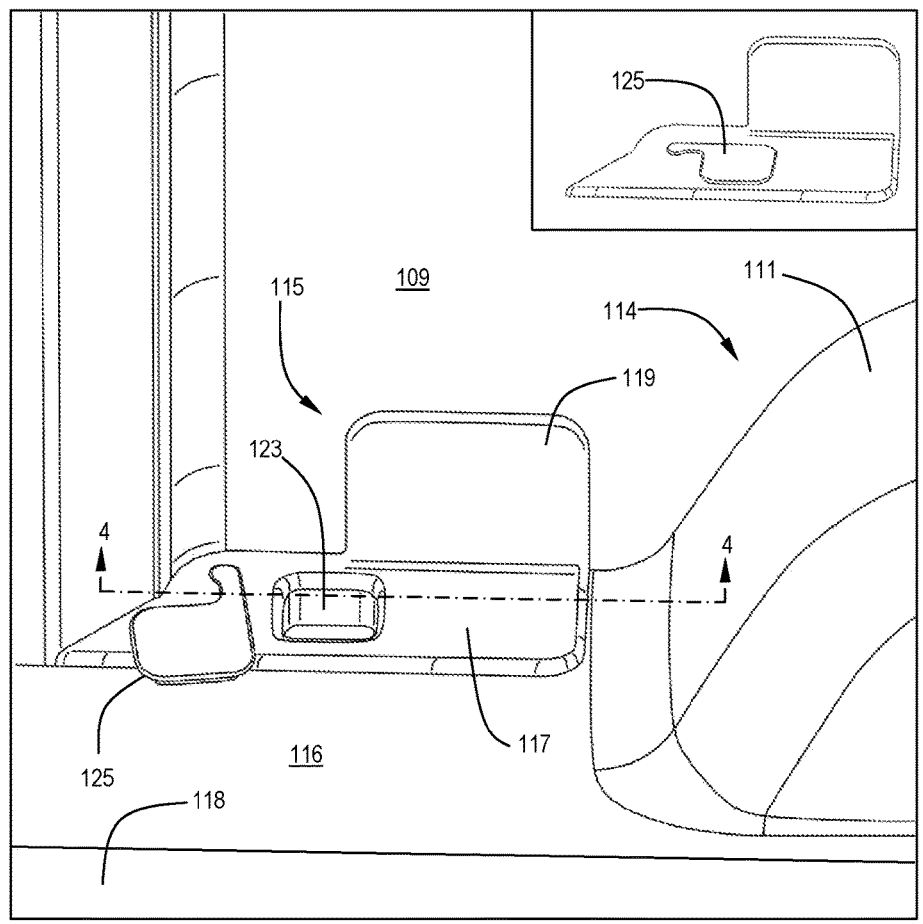
FIG. 3 illustrates an exemplary bed protector including a bed protection panel and an inner wall protection panel installed to the bed area behind the wheel well, in accordance with the present disclosure.

Additional reference to FIG. 3 shows an exemplary bed protector 115 including a bed protection panel 117 and an inner wall protection panel 119 installed to the panel 116 behind the wheel well 111. The bed protection panel 117 is generally horizontal and fits substantially flush against the bed panel 116 and the inner wall protection panel 119 is substantially vertical and fits substantially flush against the inner wall 109. The escutcheon 123 fits into the flanged opening 121 and provides retention by friction fit or through mechanical retention such as barb features 128 shown in the partial sectional view of FIG. 4. Alternative or additional retention to the inner wall 109 or bed panel 116 may be included, for example by additional plastic retention features or threaded fasteners, for example. In accordance with one embodiment, a flexible plug 125 may be provided for selectively covering the opening through the escutcheon 123. Such a plug 125 may be formed from silicone or a hard natural or synthetic rubber material, for example, and may simply retain by interference fit with the interior surface of the escutcheon 123. Flexible plug 125 is illustrated uninstalled to the escutcheon 123 in the main portion of FIG. 3 and installed to the escutcheon 123 in the inset portion of FIG. 3. The Flexible plug 125 may be flexibly attached to the bed protector 115, for example as shown by a plug 127 in the partial sectional view of FIG. 4.

Figure 4:
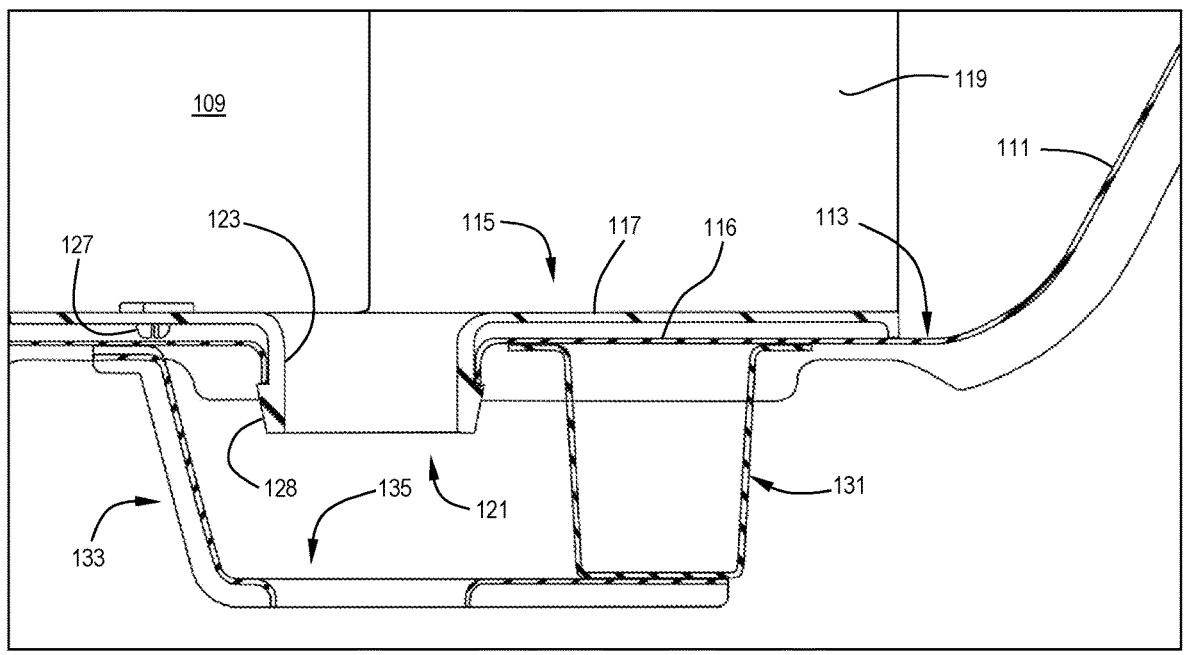
FIG. 4 illustrates a sectional view through a portion of the bed area behind the wheel well as denoted by the section line 4-4 viewed in the direction of the arrows as shown in FIG. 3, in accordance with the present disclosure.
Figure 5:
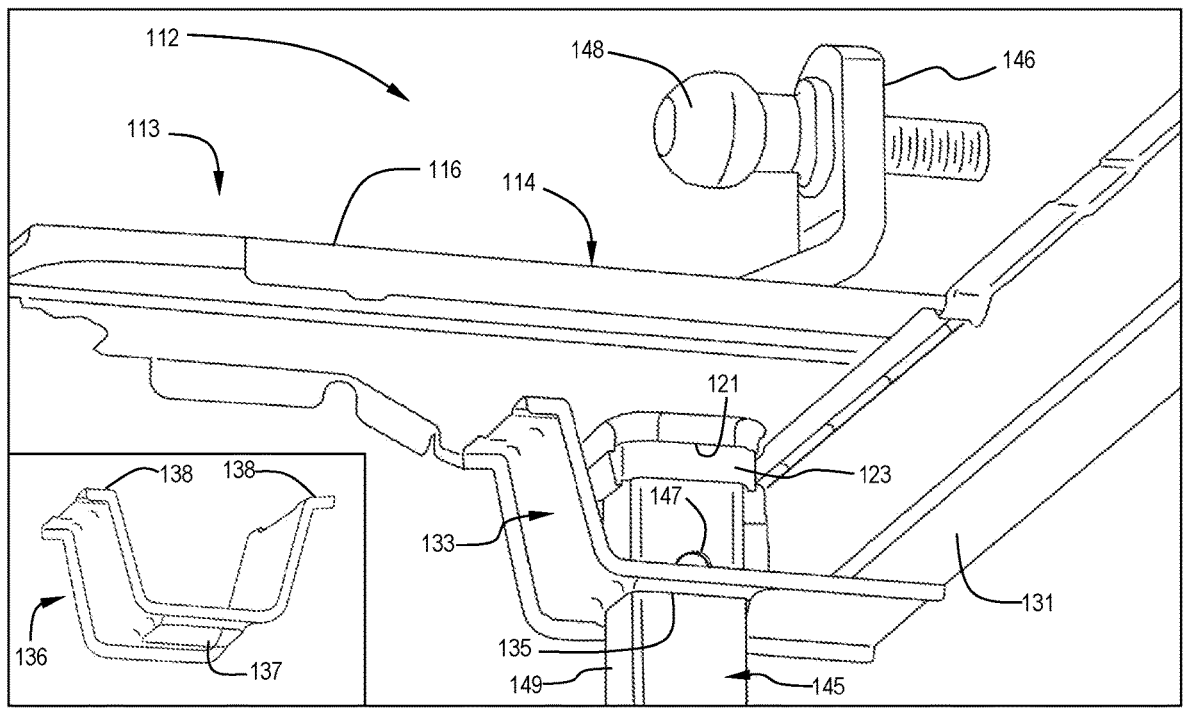
FIG. 5 illustrates an alternate view of the bed area from beneath the bed floor and includes a draw bar in a stowed position, in accordance with the present disclosure.

FIG. 4 illustrates a sectional view through a portion of the panel 116 behind the wheel well 111 as denoted by the section line 4-4 viewed in the direction of the arrows as shown in FIG. 3. FIG. 4, in addition to illustrating the features above the bed floor 113 including bed panel 116, also illustrates features beneath the bed floor 113. FIG. 5 is an alternate view of the bed area 112 from beneath the bed floor 113. The bed floor 113 may include a plurality of cross members 131 which run side to side or laterally across the underside of the bed floor 113. Cross members 131 may be spaced along the length of the floor bed 113, for example approximately every 46-61 cm. A floor assembly may include the outer bed panels 114 and inner bed panel 118 (FIG. 1) welded or otherwise fastened to the cross members 131. The floor assembly may be part of the cargo box 112 which may include the sidewalls 105 and a front wall or bulkhead (not shown). The cross members 131 are structural members that are fastened to the frame rails (not shown) with bolts inserted from below and fastened to weld nuts at the interior bottom of the cross members 131 thereby joining the cargo box to the frame structure. A shaped bracket 133 may be welded between a cross member 131 that is adjacent the flanged opening 121 and the underside of the bed panel 116 on the opposite side of the flanged opening 121 such that the bracket 133 is beneath the flanged opening and spaced therefrom. The bracket 133 includes an opening 135 which may be a flanged opening as shown and which is dimensioned large enough to pass the insertion end of a draw bar, for example, a standard 2-inch by 2-inch draw bar. The flanged opening 135 is aligned beneath the flanged opening 121 and is spaced therefrom. In one embodiment, as illustrated, the flanged opening 135 of bracket 133 does not include an escutcheon; however, an escutcheon like escutcheon 123 associated with the flanged opening 121 in bed panel 116 may be employed for similar functionality. Alternative bracket configurations are possible. For example, an alternative bracket may be a U-shaped hat bracket 136 having a portion defining an opening 137 and two free ends 138 that may be welded to the underside of the bed panel 116 on opposite sides of the flanged opening 121. Such a bracket is illustrated in the inset of FIG. 5.

Figure 6:
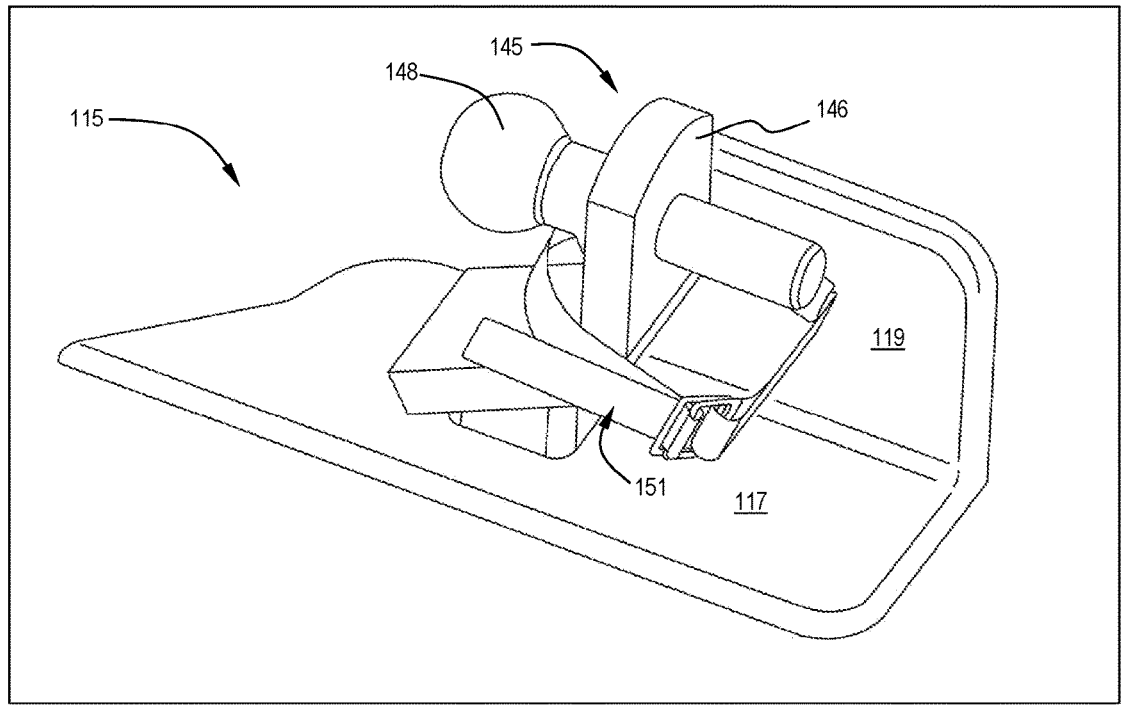
FIG. 6. illustrates an alternate view of a stowed draw bar including drop and hitch ball and an embodiment of a tether, in accordance with the present disclosure.

As best illustrated in FIG. 5, an exemplary draw bar 145 is shown and has an insertion end 149 inserted through the flanged opening 121 and escutcheon 123 in bed panel 116 and through the flanged opening 135 of bracket 133. The draw bar 145 has a drop 146 including a hitch ball 148, wherein the drop 146 provides an interference stop to the insertion of the draw bar 145. Thus, in an embodiment as illustrated including a bed protector 115, the drop 146 may rest against the bed protection panel 117 when the draw bar 145 is stowed. FIG. 6 provides an alternate view of a stowed draw bar 145 and drop 146 providing an interference stop as described. The draw bar may include a mounting hole 147 used to secure the draw bar to a receiver hitch at the back of the vehicle with a pin. In one embodiment, the mounting hole 147 may be located beneath the flanged opening 121 and escutcheon 123 in bed panel 116 and above the bracket 133 when the draw bar 145 is stowed. In another embodiment, the mounting hole may be located beneath the bracket 133 when the draw bar 145 is stowed. In either arrangement, the draw bar 145 may be secured from removal by insertion of a pin through the mounting hole preventing draw bar 145 removal or unintentional release from stowage.

FIG. 6 illustrates one embodiment of a draw bar fastening system to prevent the unintended release of a stowed draw bar 145. The fastening system may include a tether such as a flexible strap 151, for example a nylon textile or similar and a cinching buckle or tension lock. The flexible strap 151 may be attached to the inner wall 109 or bed panel 116 such as by a threaded fastener passing through the bed protector 115 and fixedly attaching the flexible strap 151. Alternately, the flexible strap 151, or alternate tether such as a lockable cable, chain or equivalent may be fed through a D-ring or other pass through feature which is attached to the inner wall 109 or bed panel 116. The tether is primarily concerned with preventing upward movement of the draw bar, not retention or prevention of fore-aft or lateral movement of the draw bar 145. Fore-aft and lateral movement of the draw bar 145 is managed via the bed panel 116 and bracket 133.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A draw bar stowage apparatus, comprising a bed floor in a cargo box of a pickup truck defining a first opening large enough to accept an insertion end of a draw bar but too small to pass a coupling end of the draw bar.

2. The apparatus of claim 1, wherein the first opening comprises a flanged opening.

3. The apparatus of claim 1, wherein the first opening is positioned rearward of a wheel well.

4. The apparatus of claim 3, wherein the first opening is positioned between a sidewall of the cargo box and a main floor region of the bed floor that is delimited by the wheel wells.

5. The apparatus of claim 1, wherein the first opening is positioned forward of a wheel well.

6. The apparatus of claim 5, wherein the first opening is positioned between a sidewall of the cargo box and a main floor region of the bed floor that is delimited by the wheel wells.

7. The apparatus of claim 1, further comprising a bracket beneath the bed floor and defining a second opening large enough to accept the insertion end of the draw bar.

8. The apparatus of claim 7, wherein the bracket is attached to the bed floor.

9. The apparatus of claim 7, wherein the bracket is attached to a lateral cross member attached to the bed floor.

10. The apparatus of claim 1, further comprising an escutcheon lining the first opening.

11. The apparatus of claim 10, wherein the escutcheon extends from a bed protection panel covering a portion of the bed floor.

12. The apparatus of claim 11, further comprising a sidewall protection panel extending from the bed protection panel and covering a portion of a sidewall of the cargo box.

13. The apparatus of claim 1, further comprising an adjustable tether coupled to one of the bed floor and a sidewall of the cargo box and configured for retaining the coupling end of a stowed draw bar.

14. The apparatus of claim 10, further comprising a removable plug for insertion into the escutcheon.

15. The apparatus of claim 11, further comprising a removable plug for insertion into the escutcheon and flexibly attached to the bed protection panel.

16. A draw bar stowage apparatus, comprising:
- a cargo box of a pickup truck including a bed floor, sidewalls and wheel wells, the bed floor of the cargo box comprising a main floor region laterally delimited by the wheel wells and floor regions forward and rearward of the wheel wells and delimited by the wheel wells, the sidewalls and the main floor region;
- one of the floor regions forward and rearward of the wheel wells defining a first opening through the bed floor large enough to accept an insertion end of a draw bar but too small to pass a coupling end of the draw bar; and
- a bracket beneath the bed floor and defining a second opening large enough to accept the insertion end of the draw bar.

17. The apparatus of claim 16, wherein the one of the floor regions forward and rearward of the wheel wells comprises a floor region rearward of a wheel well.

18. The apparatus of claim 16, further comprising a bed protector comprising a bed protection panel and an inner wall protection panel wherein the bed protection panel includes an aperture aligned with the first opening through the bed floor.

19. The apparatus of claim 16, wherein the one of the floor regions forward and rearward of the wheel wells comprises a floor region rearward of a wheel well, further comprising:
- a bed protector comprising a bed protection panel and an inner wall protection panel wherein the bed protection panel includes an aperture aligned with the first opening through the bed floor; and
- an adjustable tether coupled to one of the bed floor and a sidewall of the cargo box and configured for retaining the coupling end of a stowed draw bar.

20. A draw bar stowage apparatus, comprising:
- a cargo box of a pickup truck including a bed floor, sidewalls and wheel wells, the bed floor of the cargo box comprising a main floor region laterally delimited by the wheel wells and a floor region rearward of a wheel well and delimited by the wheel well, a sidewall and the main floor region;
- a floor region rearward of a wheel well defining a first opening through the bed floor large enough to accept an insertion end of a draw bar but too small to pass a coupling end thereof;
- a bracket attached to the bed floor and positioned beneath the bed floor and defining a second opening large enough to accept the insertion end of the draw bar;
- a bed protector including a bed protection panel, an inner wall protection panel, and an escutcheon inserted into the first opening;
- a removable plug for insertion into the escutcheon and flexibly attached to the bed protection panel; and
- an adjustable tether coupled to the cargo box and configured for retaining the coupling end of a stowed draw bar.

* * * * *